US012097866B2

United States Patent
Shintani et al.

(10) Patent No.: US 12,097,866 B2
(45) Date of Patent: Sep. 24, 2024

(54) WORKING VEHICLE

(71) Applicant: KUBOTA CORPORATION, Osaka (JP)

(72) Inventors: Koichi Shintani, Sakai (JP); Fumiya Yoshimura, Sakai (JP); Takuya Nishikubo, Sakai (JP); Takafumi Morishita, Sakai (JP); Kotaro Yamaguchi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 241 days.

(21) Appl. No.: 17/740,802

(22) Filed: May 10, 2022

(65) Prior Publication Data

US 2022/0266841 A1  Aug. 25, 2022

Related U.S. Application Data

(63) Continuation of application No. PCT/JP2020/047171, filed on Dec. 17, 2020.

(30) Foreign Application Priority Data

Dec. 18, 2019 (JP) .................. 2019-228668

(51) Int. Cl.
*A01B 76/00* (2006.01)
*B60W 50/00* (2006.01)
*B62D 49/06* (2006.01)
*G05D 1/00* (2024.01)

(52) U.S. Cl.
CPC ............ *B60W 50/00* (2013.01); *A01B 76/00* (2013.01); *G05D 1/0214* (2013.01); *B62D 49/06* (2013.01)

(58) Field of Classification Search
CPC ........ A01B 76/00; G05D 1/0214; G05D 1/43; G05D 1/622; G05D 2107/21; B62D 49/06
See application file for complete search history.

(56) References Cited

U.S. PATENT DOCUMENTS

| 11,427,134 B2 * | 8/2022 | Kamoda ................ B60R 11/04 |
| 2017/0367252 A1 | 12/2017 | Sakaguchi et al. |
| 2018/0206392 A1 | 7/2018 | Matsuzaki |
| 2020/0225348 A1 | 7/2020 | Shinkai et al. |

FOREIGN PATENT DOCUMENTS

| CN | 107226088 A | 10/2017 |
| CN | 107544488 A | 1/2018 |
| JP | 08-19 A | 1/1996 |

(Continued)

OTHER PUBLICATIONS

Official Communication issued in International Patent Application No. PCT/JP2020/047171, mailed on Mar. 9, 2021.

(Continued)

*Primary Examiner* — Huan Le
(74) *Attorney, Agent, or Firm* — Keating & Bennett, LLP

(57) ABSTRACT

A working vehicle includes a vehicle body, a linkage provided on the vehicle body to link a working device, a controller to cause the vehicle body to perform automatic travel, a rear obstacle detector to detect obstacles behind the vehicle body, and a setting changer to change rear setting information regarding obstacle detection performed by the rear obstacle detector.

14 Claims, 13 Drawing Sheets

(56) References Cited

FOREIGN PATENT DOCUMENTS

| JP | 2017-211734 | A | | 11/2017 | |
|----|-------------|---|---|---------|---|
| JP | 2018-113937 | A | | 7/2018 | |
| JP | 2018-174890 | A | | 11/2018 | |
| JP | 2019175048 | A | * | 10/2019 | ............. A01B 69/00 |
| WO | 2019/054277 | A1 | | 3/2019 | |
| WO | 2019/187884 | A1 | | 10/2019 | |

OTHER PUBLICATIONS

Official Communication issued in corresponding Chinese Patent Application No. 202080080648.8, mailed on Oct. 25, 2023.
Official Communication issued in corresponding European Patent Application No. 20901456.2, mailed on Oct. 24, 2023.

* cited by examiner

Fig.5
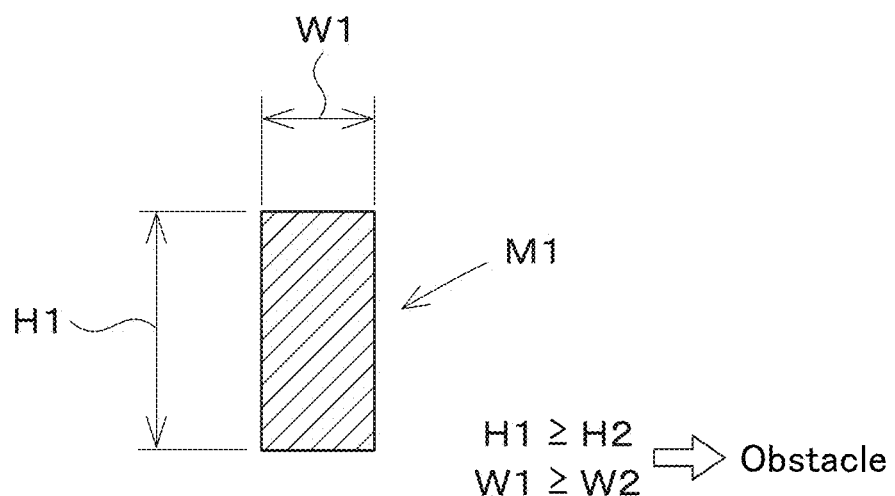
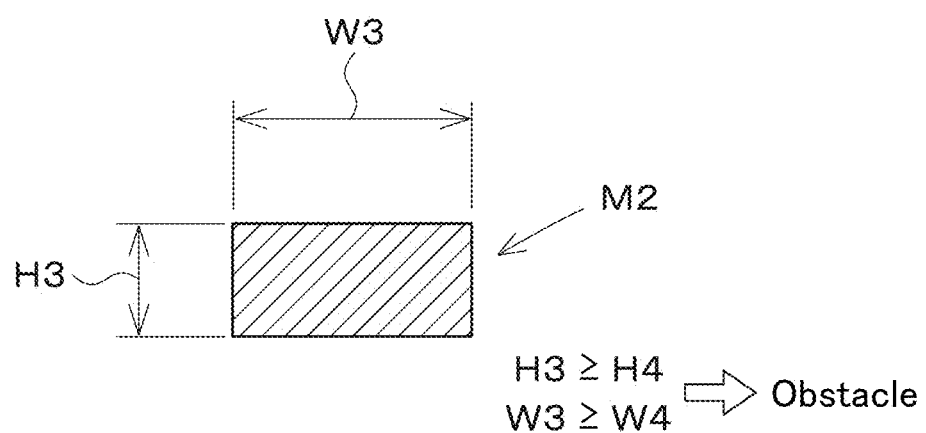

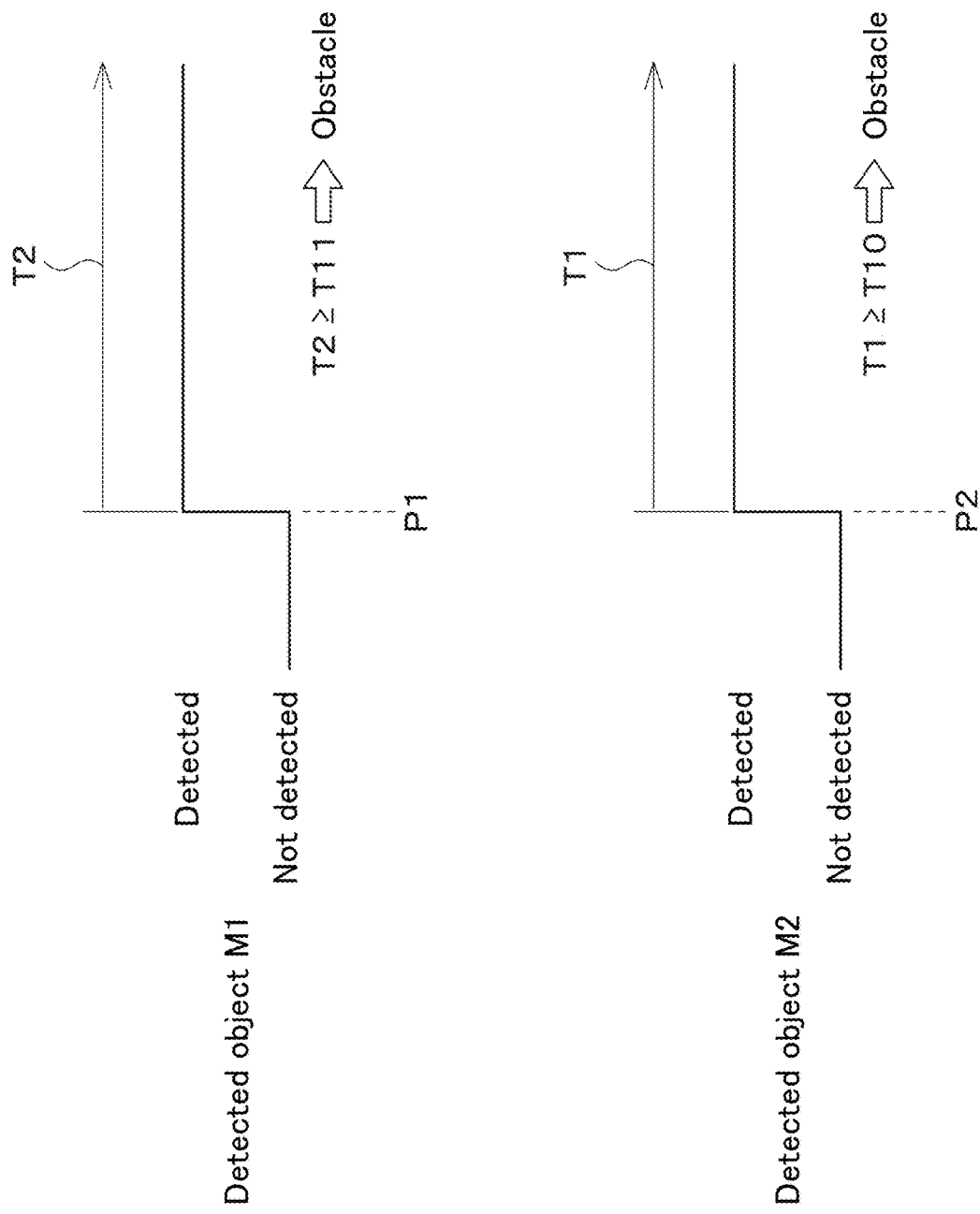

Fig.7

| Front setting information | | | Rear setting information | | |
|---|---|---|---|---|---|
| Monitored area Q1 | Detection criteria | | Monitored area Q2 | Detection criteria | |
| Monitor dimension L1 | Height threshold H2 | | Monitor dimension L10 | Height threshold H4 | |
| Monitor dimension L2 | Width threshold W2 | | Monitor dimension L11 | Width threshold W4 | |
| Monitor dimension L3 | Second threshold T11 | | | First threshold T10 | |
| Monitor dimension L5 | | | | | |
| Monitor dimension L6 | | | | | |

WORKING VEHICLE

CROSS REFERENCE TO RELATED APPLICATIONS

This application is a continuation application of International Application No. PCT/JP2020/047171, filed on Dec. 17, 2020, which claims the benefit of priority to Japanese Patent Application No. 2019-228668, filed on Dec. 18, 2019. The entire contents of each of these applications are hereby incorporated herein by reference.

BACKGROUND OF THE INVENTION

1. Field of the Invention

The present invention relates to a working vehicle such as a tractor.

2. Description of the Related Art

Japanese Unexamined Patent Application Publication No. 2018-113937 is known as an automatic traveling working vehicle which travels while doing work along a travel route.

The working vehicle (tractor) disclosed in Japanese Unexamined Patent Application Publication No. 2018-113937 includes a vehicle body equipped with a working device, a work/travel control unit to control work/travel, a set of work/travel state detecting sensors to detect work/travel states thereof, at least one obstacle sensor to detect obstacles which hinder travel, an obstacle detecting unit to detect obstacles present within an obstacle monitoring area according to a sensor signal from the at least one obstacle sensor, and an obstacle monitoring area deciding unit to decide an obstacle monitoring area according to the work/travel states detected by the set of work/travel state detecting sensors.

SUMMARY OF THE INVENTION

With the working vehicle of Japanese Unexamined Patent Application Publication No. 2018-113937, the obstacle monitoring area is decided according to the work/travel states. However, the obstacle monitoring area is decided only according to the working state during forward travel, and a rear area in which the working device is attached is not taken into consideration. That is, in reality, the obstacle monitoring area is not changed according to the working device of Japanese Unexamined Patent Application Publication No. 2018-113937 or not changed according to work.

Preferred embodiments of the present invention provide working vehicles each improving workability while efficiently performing automatic travel by changing information regarding detection of obstacles behind a vehicle body.

A working vehicle according to a preferred embodiment of the present invention includes a vehicle body, a linkage provided on the vehicle body to link a working device, a controller to cause the vehicle body to perform automatic travel, a rear obstacle detector to detect obstacles behind the vehicle body, and a setting changer to change rear setting information regarding obstacle detection performed by the rear obstacle detector.

The rear setting information includes a size of a monitored area that is monitored to detect the obstacles, and the setting changer changes the size of the monitored area according to a travel speed of the vehicle body.

The setting changer changes a size of the monitored area according to the working device linked to the vehicle body.

The rear setting information includes a size of an object to be determined as an obstacle, and the setting changer sets, according to work or the working device, the size of the object to be determined as an obstacle.

The rear obstacle detector includes a first time calculator to calculate a detection time that is a period of time for which an object located in the monitored area monitored to detect the obstacles is detected, and a first obstacle determiner to determine the object as an obstacle if the detection time calculated by the first time calculator is equal to or greater than a first threshold.

The setting changer changes the first threshold.

The working vehicle further includes a front obstacle detector to detect obstacles in front of the vehicle body, and the setting changer changes front setting information regarding obstacle detection performed by the front obstacle detector.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 5 illustrates examples of an object detected by the front obstacle detecting device(s) and an object detected by the rear obstacle detecting device.

FIG. 6 shows examples of a first detection time and a second detection time.

FIG. 7 is a diagram collectively showing setting information (front setting information, rear setting information).

DETAILED DESCRIPTION OF THE PREFERRED EMBODIMENTS

Figure 1:
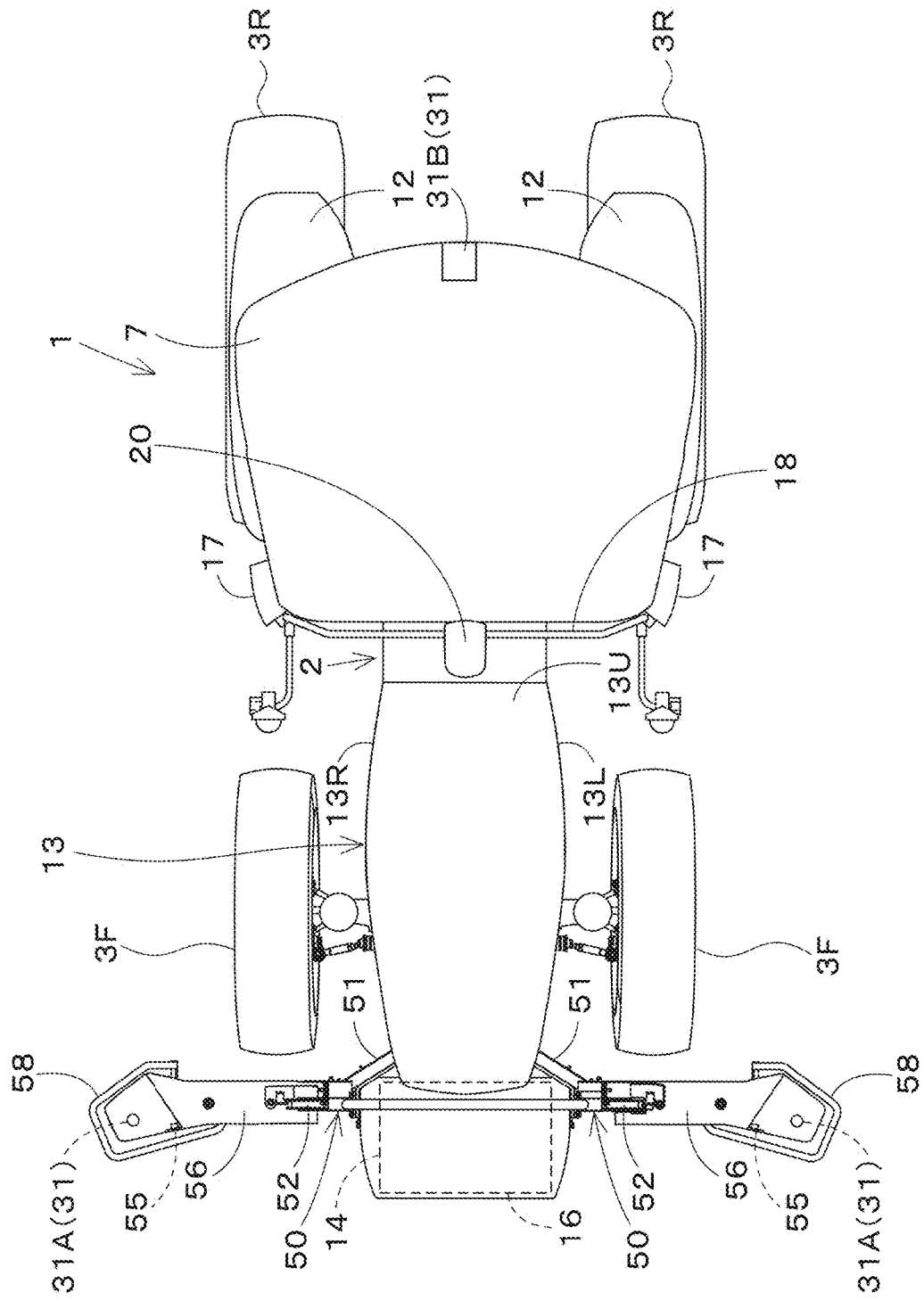
FIG. 1 is a plan view of a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings.

Figure 2:
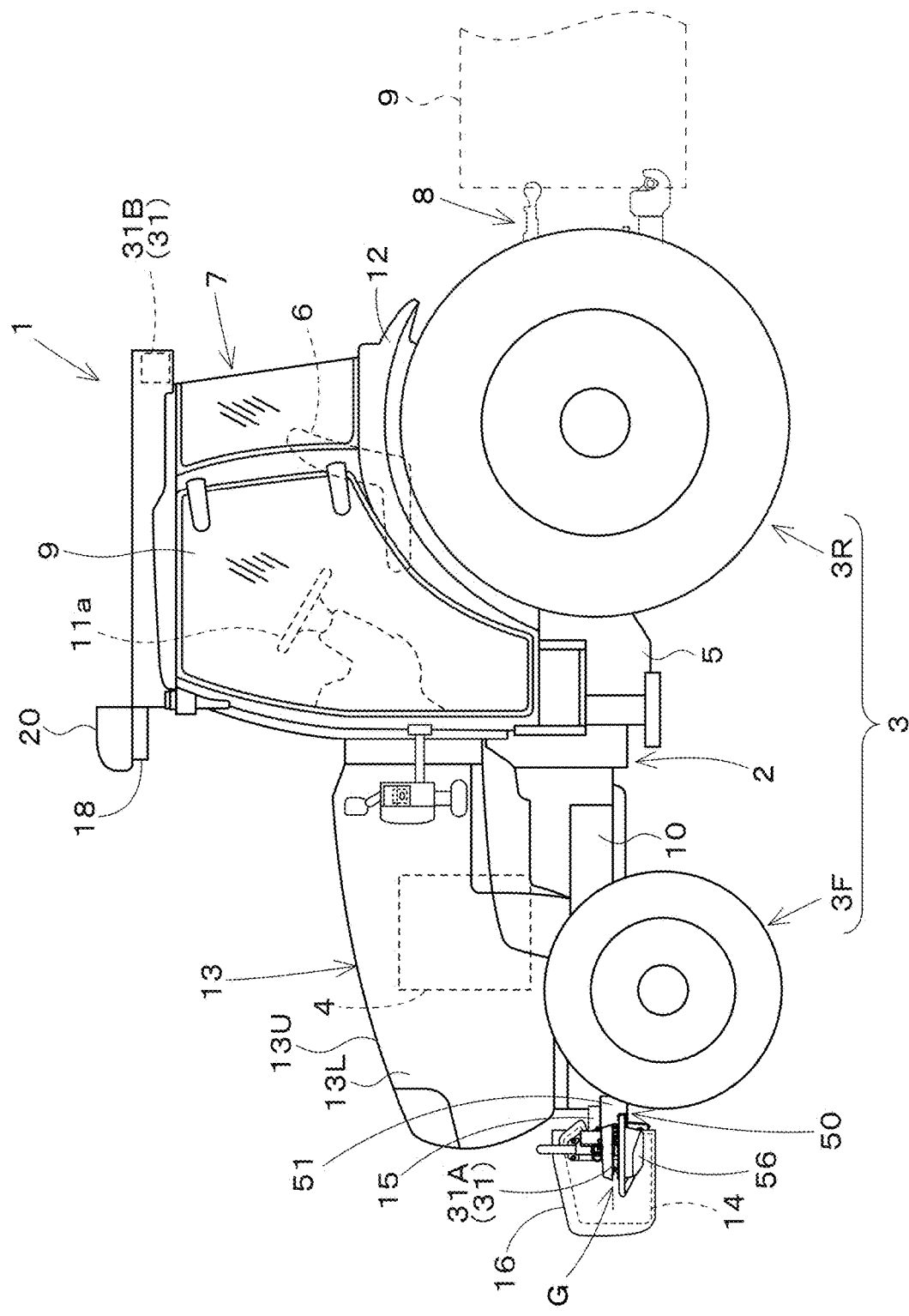
FIG. 2 is a side view of the working vehicle.

FIGS. 1 and 2 illustrate a preferred embodiment of a working vehicle 1 according to the present invention. The present preferred embodiment is discussed based on the assumption that the working vehicle 1 is a tractor 1. Note, however, that the working vehicle 1 is not limited to a tractor, and may be some other working vehicle (agricultural vehicle) such as a combine or a rice transplanter.

In the following description, the front of the tractor 1 as seen from an operator seated on the operator's seat 6 is referred to as "front", the rear of the tractor 1 as seen from the operator is referred to as "rear", the left side of the tractor 1 as seen from the operator is referred to as "left", and the right side of the tractor 1 as seen from the operator is referred to as "right". Furthermore, a direction indicated by arrow D is referred to as a vehicle width direction. Furthermore, a vehicle width direction going away from the widthwise center of the vehicle is referred to as a "vehicle width outward direction", and a vehicle width direction approaching the widthwise center of the vehicle is referred to as a "vehicle width inward direction".

As illustrated in FIGS. 1 and 2, the tractor 1 includes a vehicle body 2, a traveling device 3, a prime mover 4, and a transmission 5. The traveling device 3 supports the vehicle body 2 such that the vehicle body 2 can travel, and includes front wheel(s) 3F and rear wheel(s) 3R. The front wheel(s) 3F and the rear wheel(s) 3R in the present preferred embodiment are in the form of tires, but may be in the form of crawlers.

The prime mover 4 is an engine (diesel engine, gasoline engine), an electric motor, and/or the like. The transmission 5 is capable of changing driving forces for the traveling device 3 by changing speed stages and switching the traveling state of the traveling device 3 between forward and rearward traveling states.

The vehicle body 2 includes an operator's seat 6. An operator's seat protector 7 is provided around the operator's seat 6. In the present preferred embodiment, the operator's seat protector 7 is a cabin which surrounds the front, rear, upper, and lateral sides of the operator's seat 6 to protect the operator's seat 6, but may be a ROPS or the like. A linkage 8 is provided at the rear of the vehicle body 2. The linkage 8 includes a swinging drawbar which connects a working device 9 and the vehicle body 2 but does not raise or lower the working device 9, a raising/lowering device which includes a three-point linkage or the like and which raises and lowers the working device 9, or the like. The linkage is configured to have the working device (implement or the like) 9 detachably attached thereto.

By linking the working device 9 to the linkage 8, it is possible to allow the vehicle body 2 to tow the working device 9. The working device 9 is, for example, a cultivator for cultivation, a fertilizer spreader for spreading fertilizer, an agricultural chemical spreader for spreading agricultural chemicals, a harvester for harvesting, a mower for mowing grass or the like, a tedder for tedding grass or the like, a rake for raking grass or the like, a baler for baling grass or the like, or the like.

The vehicle body 2 includes a vehicle body frame 10. The vehicle body frame 10 extends in a direction from the transmission 5 to the front, and supports a lower portion of the prime mover 4. As illustrated in FIG. 2, a hood 13 is provided above the vehicle body frame 10. The hood 13 extends in a front-rear direction along the vehicle body frame 10. The hood 13 is disposed forward of a central portion of the operator's seat protector 7 in the vehicle width direction. The hood 13 includes a left side wall 13L provided on the left side, a right side wall 13R provided on the right side, and a top wall portion 13U which connects upper portions of the left side wall 13L and the right side wall 13R. The left side wall 13L, the right side wall 13R, and the top wall portion 13U define an engine room, and the engine room houses therein the prime mover 4, a cooling fan, a radiator, a battery, and/or the like. The front wheels 3F are disposed leftward of the left side wall 13L and rightward of the right side wall 13R, respectively.

A weight 14 is provided forward of the hood 13, i.e., forward of the vehicle body frame 10. The weight 14 is attached to a weight bracket 15 provided at the front of the vehicle body 2. The weight bracket 15 is attached to a front portion of the vehicle body frame 10 with fastener(s) such as bolt(s). The weight 14 is surrounded and covered by a weight cover 16.

Figure 3:
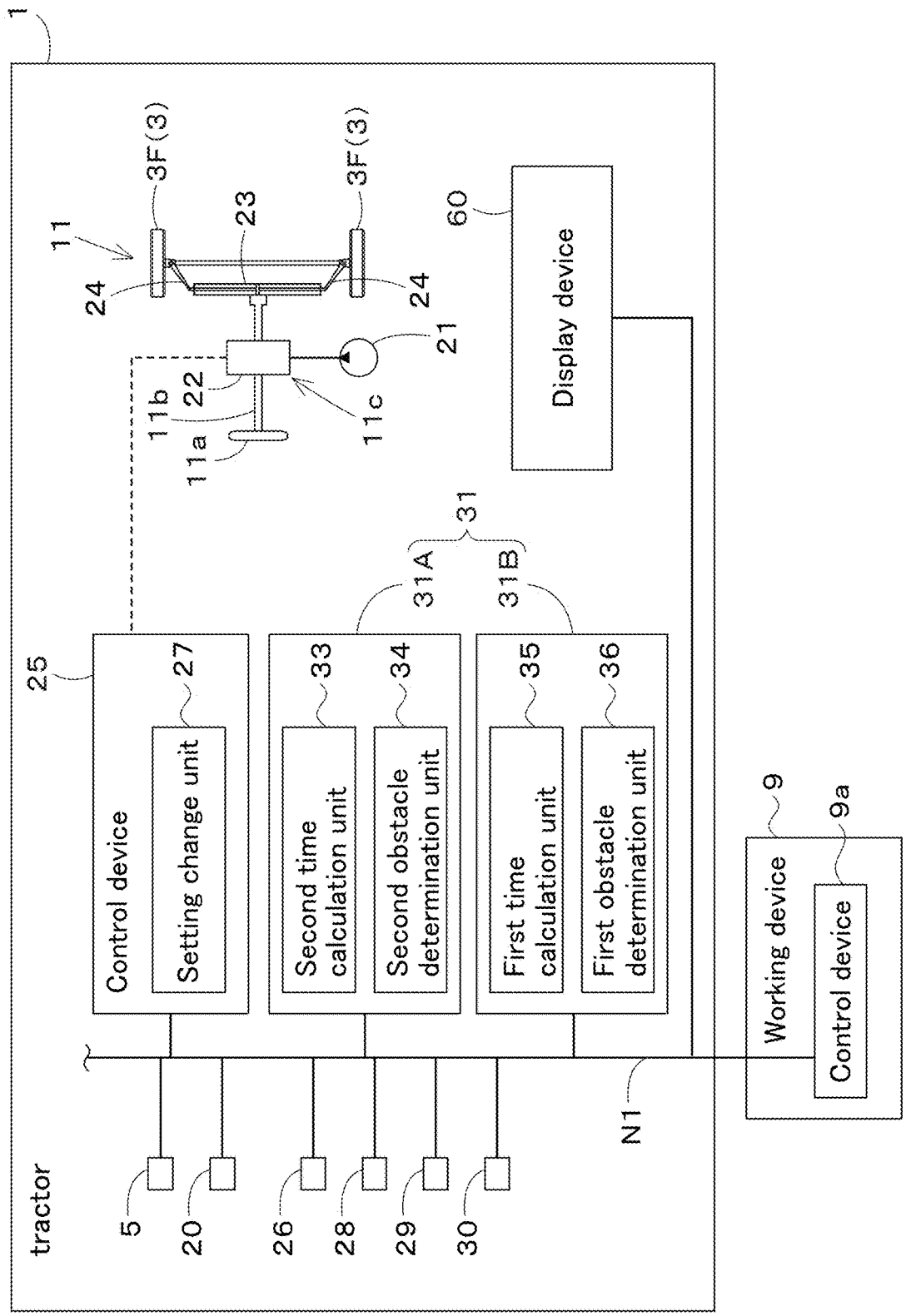
FIG. 3 is a block diagram of a control system of the working vehicle.

As illustrated in FIG. 3, the tractor 1 includes a steering unit 11. The steering unit 11 includes a steering wheel 11a, a rotation shaft (steering shaft) 11b which rotates as the steering wheel 11a rotates, and an assist mechanism (power steering mechanism) 11c to assist steering performed using the steering wheel 11a. The assist mechanism 11c includes a hydraulic pump 21, a control valve 22 supplied with hydraulic fluid discharged from the hydraulic pump 21, and a steering cylinder 23 which is caused to function by the control valve 22. The control valve 22 is a solenoid valve which functions based on a control signal. The control valve 22 is, for example, a three-way switching valve which achieves multi-position switching by movement of a spool or the like. The positions of the control valve 22 can also be switched by steering by the steering shaft 11b. The steering cylinder 23 is connected to arms (knuckle arms) 24 which change the orientation of the front wheels 3F.

Therefore, upon operation of the steering wheel 11a, the position and the degree of opening of the control valve 22 change according to the steering wheel 11a, and the steering cylinder 23 extends or retracts leftward or rightward according to the position and the degree of opening of the control valve 22, making it possible to change the steering direction of the front wheels 3F. Note that the foregoing steering unit 11 is an example, and a configuration of the steering unit 11 is not limited to that described above.

As illustrated in FIGS. 1 and 2, the tractor 1 includes a position detecting device 20. The position detecting device 20 is attached to a front portion of a top plate of the cabin 7 via a mount 18. Note, however, that the location at which the position detecting device 20 is attached is not limited to that illustrated in FIGS. 1 and 2, and the position detecting device 20 may be attached to the top plate of the cabin 7, some other location on the vehicle body 2, or the like location. The position detecting device 20 may be attached to a working device such as a cultivator.

The position detecting device 20 is a device to detect the position thereof (measured position information including latitude and longitude) using a satellite positioning system. Specifically, the position detecting device 20 receives signals (positions of positioning satellites, time of transmission, correction information, and/or the like) from positioning satellites, and detects the position (latitude and longitude) on the basis of the received signals. The position detecting device 20 may detect, as the position thereof (latitude and longitude), a position corrected with a signal such as a correction signal from a base station (reference station) which is capable of receiving signals from the GPS satellites. The position detecting device 20 may include an inertial measurement unit such as a gyroscope sensor and/or an acceleration sensor and detect, as the position thereof, a position corrected by the inertial measurement unit. With the position detecting device 20, it is possible to detect the position of the vehicle body 2 of the tractor 1 (position of the vehicle body 2 that is traveling). The position of the tractor 1 itself detected by the position detecting device 20 may be the position of the center of the vehicle body 2 or may be, for example, the position of the front wheels 3F (e.g., the position of the front edge) or the position of the rear wheels 3R (e.g., the position of the rear edge).

As illustrated in FIGS. 1 and 2, the tractor 1 includes obstacle detecting devices 31 to detect obstacles which would hinder travel. The obstacle detecting devices 31 include front obstacle detecting devices 31A and a rear obstacle detecting device 31B. The front obstacle detecting devices 31A are each a device configured to detect obstacles in front of the vehicle body 2. The rear obstacle detecting device 31B is a device configured to detect obstacles behind the vehicle body 2. The front obstacle detecting devices 31A and the rear obstacle detecting device 31B are laser scanners to detect obstacles by emitting light waves as detection waves. Note, however, that each obstacle detecting device may be a sensor (range sensor) other than laser scanners, such as a sonar which detects obstacles by emitting sound waves (ultrasonic waves) as detection waves.

The front obstacle detecting devices 31A are provided at different positions from the rear obstacle detecting device 31B in the front-rear direction. In the present preferred embodiment, the front obstacle detecting devices 31A are provided forward of the rear obstacle detecting device 31B. The front obstacle detecting devices 31A are disposed forward of the front wheels 3F. The front obstacle detecting devices 31A are disposed outward of the front wheels 3F in the vehicle width outward directions (disposed on the vehicle width outward sides of the front wheels 3F). The front obstacle detecting devices 31A are disposed outward of the rear wheels 3R in the vehicle width outward directions (disposed on the vehicle width outward sides of the rear wheels 3R).

The front obstacle detecting devices 31A are disposed at a position diagonally leftward and forward of the left front wheel 3F and a position diagonally rightward and forward of the right front wheel 3F, respectively. The front obstacle detecting device 31A disposed diagonally leftward and forward of the left front wheel 3F and the front obstacle detecting device 31A disposed diagonally rightward and forward of the right front wheel 3F are located symmetrically with respect to a center line bisecting the width of the tractor 1.

Each front obstacle detecting device 31A is attached to the vehicle body frame 10 via a mounting structure 50. As illustrated in FIGS. 1 and 2, the mounting structure 50 includes a first structure 51, a second structure 52, a third structure 53, and a fourth structure 54. The first structure 51 is attached to the vehicle body frame 10, and extends from the vehicle body frame 10 diagonally forward and in a vehicle width outward direction (extends diagonally forward and leftward or extends diagonally forward and rightward). The second structure 52 is attached to a front end (distal end) of the first structure 51. The second structure 52 extends outward along the width direction of the machine body and supports the front obstacle detecting device 31A. A sonar 55 other than a sonar of the rear obstacle detecting device 31B is attached to the second structure 52. The direction of a laser emitted from the front obstacle detecting device 31A is a horizontal direction.

The front obstacle detecting device 31A and a portion of the second structure 52 are covered by a cover 56. The cover 56 is attached to the second structure 52 with mounting member(s) such as bolt(s). The cover 56 includes an upper cover disposed above the front obstacle detecting device 31A and a lower cover disposed below the front obstacle detecting device 31A. Around the front obstacle detecting device 31A, a gap G is located between the upper cover 56A and the lower cover 56B (see FIG. 2), and the front obstacle detecting device 31A can emit and receive detection waves (laser) through the gap G. The sonar 55 can emit and receive detection waves (sound waves) through an opening in the upper cover 56A.

The rear obstacle detecting device 31B is attached to an upper rear portion of the cabin 7 via a bracket (not illustrated). The detecting direction of the rear obstacle detecting device 31B is inclined slightly downward with respect to a horizontal direction, i.e., oriented toward the working device 9. Note that the detecting direction is the direction of the optical axis along which laser is emitted in the case where the rear obstacle detecting device 31B is a laser scanner, the direction in which sound waves are emitted in the case where the rear obstacle detecting device 31B is a sonar, and the direction of the optical axis of an image sensor (central axis of a lens) in the case where the rear obstacle detecting device 31B is a camera.

Each front obstacle detecting device 31A stores front setting information regarding obstacle detection, and the rear obstacle detecting device 31B stores rear setting information regarding obstacle detection. The front setting information and the rear setting information include various types of information for the obstacle detecting devices 31 (front obstacle detecting devices 31A and the rear obstacle detecting device 31B) to detect obstacles, such as monitored areas, criteria for determination of whether an object detected in a monitored area is an obstacle or not, and/or the like.

First, the monitored areas are discussed.

Figure 4:
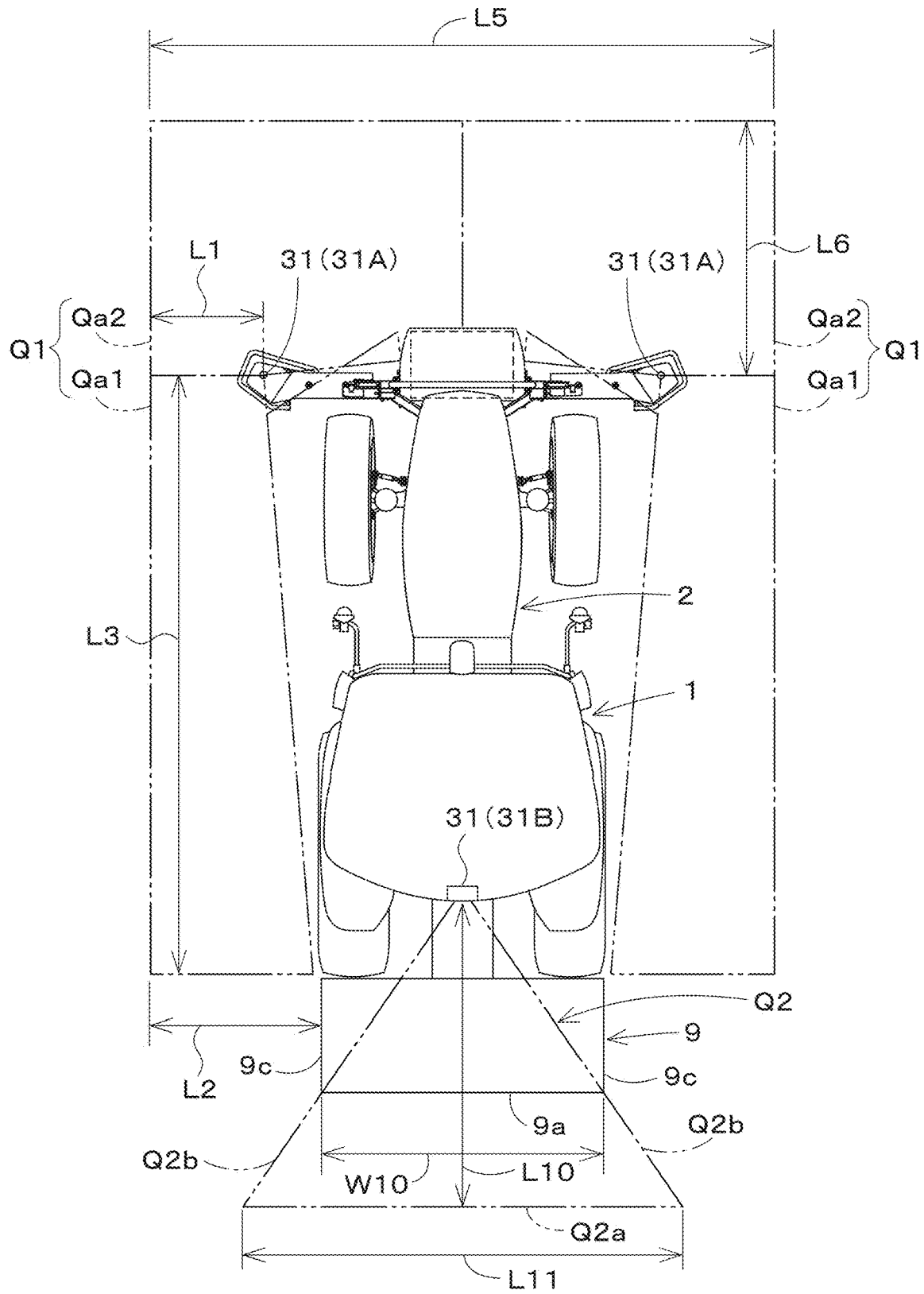
FIG. 4 illustrates examples of monitored areas and of front obstacle detecting devices and a rear obstacle detecting device.

FIG. 4 illustrates examples of monitored areas Q1 and Q2 of the front obstacle detecting devices 31A and the rear obstacle detecting device 31B.

The monitored area Q1 of each front obstacle detecting device 31A includes a side area Qa1 extending from the front obstacle detecting device 31A to the rear of the vehicle body 2 and an area lateral to the vehicle body 2 (an area outward of the vehicle body 2 in the width direction) and a front area Qa2 extending from the front obstacle detecting device 31A in a vehicle width inward direction in front of the vehicle body 2. Each side area Qa1 is defined by monitor dimensions L1 and L2 each extending outward along the width direction and a dimension L3 along the front-rear direction. The front areas Qa2 are defined by a monitor dimension L6 extending forward and a monitor dimension L5 along the width direction. As shown in FIG. 7, default values (reference monitored area, reference monitor dimensions) of the size (monitor dimensions L1, L2, L3, L5, and L6) of the monitored area Q1 are stored as front setting information for the front obstacle detecting devices 31A.

The monitored area Q2 of the rear obstacle detecting device 31B extends from the rear obstacle detecting device 31B to an area rearward of the vehicle body 2, and is defined by a monitor dimension L10 extending rearward and a monitor dimension L11 extending along the width direction. As shown in FIG. 7, default values (reference monitored area, reference monitor dimensions) of the size (monitor dimensions L10 and L11) of the monitored area Q2 are stored as rear setting information for the rear obstacle detecting device 31B. Note that the sizes of the monitored areas Q1 and Q2 of the front obstacle detecting devices 31A and the rear obstacle detecting device 31B can be freely set, and thus the width, length, angle, and/or the like thereof can be changed.

FIG. 5 illustrates examples of an object M1 detected by the front obstacle detecting device(s) 31A and an object M2 detected by the rear obstacle detecting device 31B.

In FIG. 5, when an object M1 is located within a monitored area Q1, the front obstacle detecting device 31A detects the object (detected object) M1. If a height H1 of the detected object M1 is equal to or more than a height threshold H2 (H1≥H2) and an object width W1 of the detected object M1 is equal to or more than a width threshold W2 (W1≥W2), the front obstacle detecting device 31A determines the detected object M1 as an obstacle. If the height H1 of the detected object M1 is less than the height threshold H2 or the object width W1 of the detected object M1 is less than the width threshold W2, the front obstacle detecting device 31A determines the detected object M1 as not an obstacle. As shown in FIG. 7, the front obstacle detecting device 31A stores the height threshold H2 and the width threshold W2 as criteria for determination of whether or not the detected object M1 is an obstacle. That is, the front obstacle detecting device 31A stores the height threshold H2 and the width threshold W2, which are criteria, as front setting information.

When an object M2 is located within the monitored area Q2, the rear obstacle detecting device 31B detects the object (detected object) M2. If a height H3 of the detected object M2 is equal to or more than a height threshold H4 (H3≥H4) and an object width W3 of the detected object M2 is equal to or more than a width threshold W4 (W3≥W4), the rear obstacle detecting device 31B determines the detected object M2 as an obstacle. If the height H3 of the detected object M2 is less than the height threshold H4 or the object width W3 of the detected object M2 is less than the width threshold W4, the rear obstacle detecting device 31B determines the detected object M2 as not an obstacle. As shown in FIG. 7, the rear obstacle detecting device 31B stores the height threshold H4 and the width threshold W4 as criteria for determination of whether or not the detected object M2 is an obstacle. That is, the rear obstacle detecting device 31B stores the height threshold H4 and the width threshold W4, which are criteria, as rear setting information.

In the foregoing preferred embodiment, whether the detected object M1 (M2) is an obstacle or not is determined based on the size (height H1 (H3) and object width W1 (W4)) of the detected object M1 (M2)), but whether the detected object M1 (M2) is an obstacle or not may be determined based on a period of time for which the detected object M1 (M2) is located in the monitored area Q1 (Q2) (a period of time for which the detected object M1 (M2) stays in the monitored area Q1 (Q2)).

The front obstacle detecting device 31A includes a second time calculation unit 33 and a second obstacle determination unit 34. Each of the second time calculation unit 33 and the second obstacle determination unit 34 includes electric circuit(s), electronic circuit(s), and/or the like provided in the front obstacle detecting device 31A, program(s) stored in the front obstacle detecting device 31A, and/or the like.

The second time calculation unit 33 calculates a detection time (second detection time) T2 that is a period of time for which the detected object M1 is located in the monitored area Q1. The second obstacle determination unit 34 determines the detected object M1 as an obstacle if the second detection time T2 calculated by the second time calculation unit 33 is equal to or greater than a second threshold T11, and determines the detected object M1 as not an obstacle if the second detection time T2 is less than the second threshold T11. Note that the front obstacle detecting device 31A stores the second threshold T11 as a criterion. That is, the front obstacle detecting device 31A stores the second threshold T11, which is a criterion, as front setting information.

Note that the default value of the second threshold T11 can be set using a setting member such as a rotary switch before the start of automatic operation. Specifically, the second threshold T11 is set according to the operation amount of the setting member, the default value is set to a minimum value when the operation amount is smallest, and the default value is set to a maximum value when the operation amount is largest. The maximum value (T11 max) of the second threshold T11 may be determined by subtracting braking distance and fallback distance from the default value of monitor dimension L6 and then dividing it by prescribed travel speed, i.e., "T11 max=[default value of monitor dimension L6−braking distance−fallback distance]/ prescribed travel speed". The braking distance and the fallback distance are found via simulation, experimentation, and/or the like, and the prescribed travel speed is set according to agricultural work. A method of calculating the maximum value of the second threshold T11 is not limited.

The rear obstacle detecting device 31B includes a first time calculation unit 35 and a first obstacle determination unit 36. Each of the first time calculation unit 35 and the first obstacle determination unit 36 includes electric circuit(s), electronic circuit(s), and/or the like provided in the rear obstacle detecting device 31B, program(s) stored in the rear obstacle detecting device 31B, and/or the like.

The first time calculation unit 35 calculates a detection time (first detection time) T1 that is a period of time for which the detected object M2 is located in the monitored area Q2. The first obstacle determination unit 36 determines the detected object M2 as an obstacle if the first detection time T1 calculated by the first time calculation unit 35 is equal to or greater than a first threshold T10, and determines the detected object M2 as not an obstacle if the first detection time T1 is less than the first threshold T10. Note that the rear obstacle detecting device 31B stores the first threshold T10 as a criterion. That is, the rear obstacle detecting device 31B stores the first threshold T10, which is a criterion, as rear setting information. Note that the default value of the first threshold T10 can be set using a setting member such as a rotary switch before the start of automatic operation. Specifically, the first threshold T10 is set according to the operation amount of the setting member, the default value is set to a minimum value when the operation amount is smallest, and the default value is set to a maximum value when the operation amount is largest.

FIG. 6 shows examples of the second detection time T2 that starts upon detection of the detected object M1 by the front obstacle detecting device 31A and the first detection time T1 that starts upon detection of the detected object M2 by the rear obstacle detecting device 31B.

As shown in FIG. 6, assume that the detected object M1 entered the monitored area Q1 at a point in time P1. The second time calculation unit 33 calculates the second detection time T2 for which the detected object M1 is in the monitored area Q1. When the second detection time T2 has reached the second threshold T11, the second obstacle determination unit 34 determines the detected object M1 as an obstacle.

Assume that the detected object M2 entered the monitored area Q2 at a point in time P2. The first time calculation unit 35 calculates the first detection time T1 for which the detected object M2 is in the monitored area Q2. When the first detection time T1 has reached the first threshold T10, the first obstacle determination unit 36 determines the detected object M2 as an obstacle.

As illustrated in FIG. 3, the tractor 1 includes a control device 25. The control device 25 includes a CPU, storage unit(s) (such as RAM and/or ROM), and/or the like and performs various types of control regarding the tractor 1 on the basis of program(s) stored in the storage unit(s) and/or the like.

The control device 25 has connected thereto a state detecting device 26 to detect the driving state and/or the like of the tractor 1. The state detecting device 26 is, for example, a crank sensor, a cam sensor, an engine rotation sensor, an accelerator pedal sensor, a vehicle speed sensor, an acceleration sensor, a steering angle sensor, a raising/lowering lever detection sensor, a PTO rotation detecting sensor, and/or the like. The control device 25 also has connected thereto the transmission 5, a forward/rearward travel switching device 28, a PTO clutch 29, and a braking device 30.

The state detecting device 26 is connected with the transmission 5, the forward/rearward travel switching device 28, the PTO clutch 29, and the braking device 30 via an in-vehicle network N1 such as controller area network (CAN) and/or international standard ISO11783 (ISO-BUS). A control device 9a of the working device 9 is connected to the in-vehicle network N1. The control device 9a includes, for example, electric circuit(s), electronic circuit(s), and/or the like including a CPU, storage unit(s) (such as RAM and/or ROM), and/or the like, and controls the working device 9.

The control device 25 controls a travelling system and a working system of the tractor 1. For example, the control device 25 controls engine speed, vehicle speed, the angle of steering by the steering unit 11, and/or the like on the basis of the state(s) detected by the state detecting device 26. The control device 25 controls raising and lowering of the raising/lowering device, PTO rotation speed, and/or the like on the basis of the states(s) detected by the state detecting device 26.

The control device 25 is configured or programmed to control automatic travel (perform automatic travel control) of the tractor 1 (vehicle body 2). The control device 25 is configured or programmed to switch between an automatic travel mode and a manual travel mode. In the automatic travel mode, the control device 25 causes the vehicle body 2 to automatically travel along a predetermined travel route. The control device 25 sets the position and the degree of opening of the control valve 22 so that the position of the vehicle body 2 that is traveling (the position detected by the position detecting device 20) matches a predetermined travel route (travel path), that is, the vehicle body 2 matches the travel route. In other words, in the automatic travel mode, the control device 25 sets the direction and amount of movement of the steering cylinder 23 (steering direction and steering angle of the front wheels 3F) so that the position of the traveling tractor 1 matches the travel route.

Specifically, in the automatic travel mode, the control device 25 compares the position of the vehicle body 2 that is traveling and the position indicated by the travel route (planned travel position), and, if the position of the vehicle body 2 that is traveling matches the planned travel position, the control device 25 maintains the angle and direction of steering by the steering wheel 11a of the steering unit 11 (the steering angle and the steering direction of the front wheels 3F) without changing them (maintains the degree of opening and the position of the control valve 22 without changing them). If the position of the vehicle body 2 that is traveling does not match the planned travel position, the control device 25 changes the angle and/or direction of steering by the steering wheel 11a of the steering unit 11 (changes the degree of opening and/or the position of the control valve 22) so that the deviation (amount of deviation) between the position of the vehicle body 2 that is traveling and the planned travel position is zero.

Note that, although the control device 25 changes the angle of steering by the steering unit 11 on the basis of the deviation between the position of the vehicle body 2 that is traveling and the planned travel position in the automatic travel control in the present preferred embodiment, the control device 25 may, in the case where the direction of the travel route and the travel direction of the tractor 1 (vehicle body 2) (vehicle body heading direction) differ from each other, set the steering angle so that the vehicle body heading direction matches the direction of the travel route. The control device 25 may set, in the automatic travel control, the final steering angle for the automatic travel control on the basis of a steering angle determined based on the deviation (deviation in position) and a steering angle determined based on the deviation in direction. The steering angle may be set by a method differing from the above-described method of setting the steering angle in the automatic travel control.

The control device 25 may control, in the automatic travel control, the rotation speed of the traveling device 3 (i.e., the front wheels 3F and/or the rear wheel 3R) so that the actual speed of the tractor 1 (vehicle body 2) matches a vehicle speed corresponding to a predetermined travel route.

Furthermore, the control device 25 controls automatic travel on the basis of a result of obstacle detection by the obstacle detecting devices 31. For example, the control device 25 continues automatic travel if the obstacle detecting device(s) 31 has/have detected no obstacles, and stops the automatic travel if the obstacle detecting device(s) 31 has/have detected obstacle(s). More specifically, if the obstacle detecting device(s) 31 has/have detected an obstacle, the control device 25 stops the automatic travel by stopping the tractor 1 from traveling if the distance between the obstacle and the tractor 1 is equal to or less than a predetermined distance.

Specifically, if the obstacle detecting device(s) 31 has/have detected an obstacle, the control device 25 controls the operation of the transmission 5, the forward/rearward travel switching device 28, the PTO clutch 29, and the braking device 30. Specifically, the control device 25 reduces vehicle speed by changing the speed stage of the transmission 5 to a lower speed stage. Furthermore, the control device 25 switches the state of the forward/rearward travel switching device 28 to a neutral state and activates the braking device 30. This stops the automatic travel of the tractor 1. Furthermore, the control device 25 switches the PTO clutch 29 into an OFF state to block the transmission of power from the PTO shaft of the tractor 1 to the working device 9. This stops the working device 9 from being driven.

As illustrated in FIG. 3, the control device 25 includes a setting change unit 27. The setting change unit 27 includes electric circuit(s), electronic circuit(s), program(s), and/or the like provided in the control device 25. The setting change unit 27 is configured to change rear setting information for the rear obstacle detecting device 31B.

The setting change unit 27 changes the size of the monitored area Q2 according to the travel speed of the vehicle body 2. Specifically, upon initiation of automatic travel under the automatic travel control by the control device 25, the setting change unit 27 refers to the vehicle speed (travel speed) of the vehicle body 2 detected by the vehicle speed sensor. When the travel speed has exceeded a travel speed threshold, the setting change unit 27 changes the monitor dimension L10 so that the monitor dimension L10 is greater than the default value (reference monitor dimension). That is, the setting change unit 27 makes the monitor dimension L10 greater than the default value (reference monitor dimension) to make the size of the monitored area Q2 lager than the reference monitored area.

On the contrary, if the travel speed has become less than the travel speed threshold, the setting change unit 27 changes the monitor dimension L10 so that the monitor dimension L10 is less than the default value (reference monitor dimension). That is, the setting change unit 27 makes the monitor dimension L10 less than the default value (reference monitor dimension) to make the size of the monitored area Q2 smaller than the reference monitored area. The travel speed threshold is a value for the setting change unit 27 to determine whether the vehicle speed is high speed or low speed. The travel speed threshold may be pre-stored in the control device 25 and may be changed using a rotary switch or the like, and there is no limitation.

Note that the monitor dimension L10 may be changed (increased or reduced) according to the travel speed. For example, the setting change unit 27 gradually increases the monitor dimension L10 as the travel speed increases and gradually reduces the monitor dimension L10 as the travel speed decreases, in proportion to the travel speed. With regard to changing the monitored area Q2 and/or the like by the setting change unit 27, the monitored area Q2 and/or the like may be changed according to the travel speed of the vehicle body 2 during backward travel.

Figure 8A:
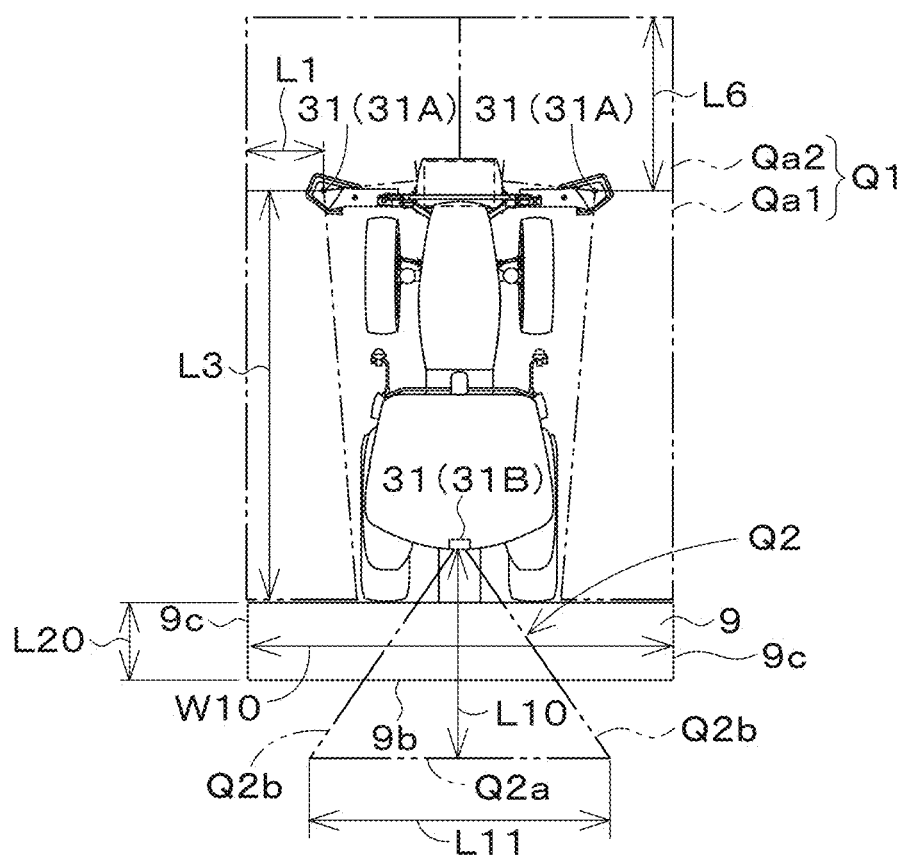
FIG. 8A illustrates a case in which a monitor dimension is less than a machine width of a working device.
Figure 8B:
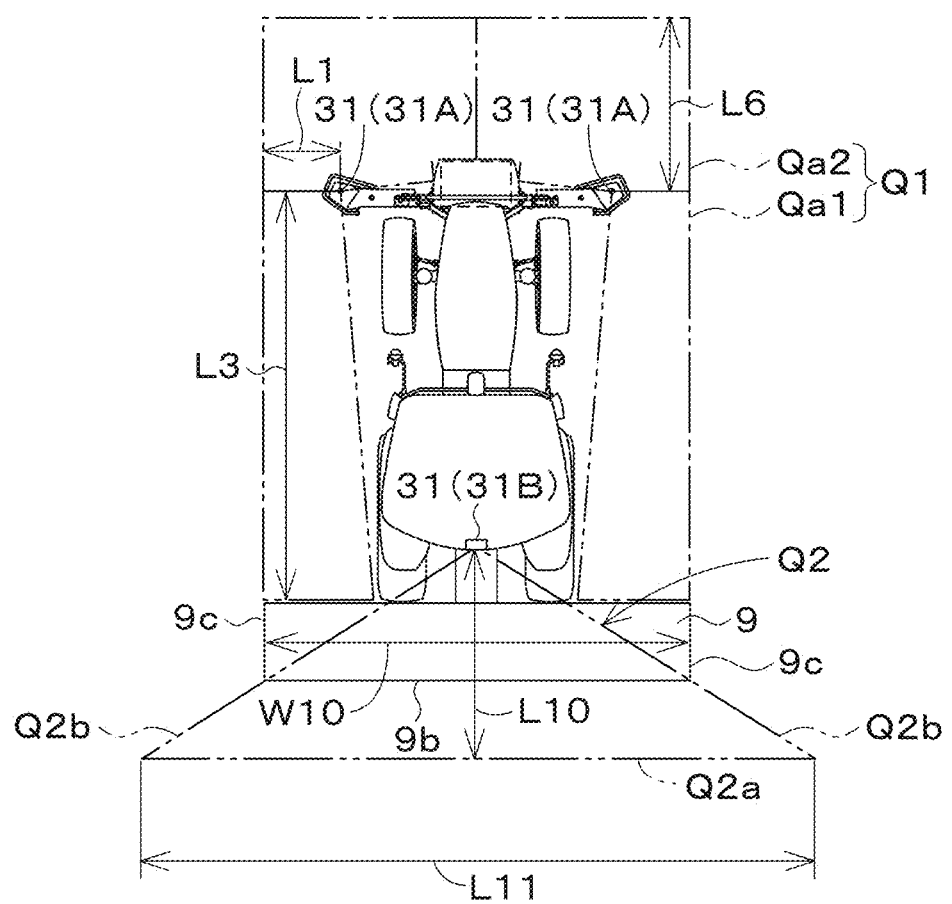
FIG. 8B illustrates a case in which the monitor dimension is greater than the machine width of the working device.

The setting change unit 27 changes the monitor dimension (s) L10 and/or L11 according to the working device 9 linked to the vehicle body 2. Specifically, upon linkage of the working device 9 to the vehicle body 2, the setting change unit 27 acquires a machine width W10 and a machine length L20 of the working device 9 from the control device 9*a* of the working device 9 via the in-vehicle network N1. As illustrated in FIG. 8A, if the default value (reference monitor dimension) of the monitor dimension L11 is less than the machine width W10 of the working device 9, as illustrated in FIG. 8B, the setting change unit 27 makes the monitor dimension L11 greater than the machine width W10 of the working device 9.

Figure 8C:
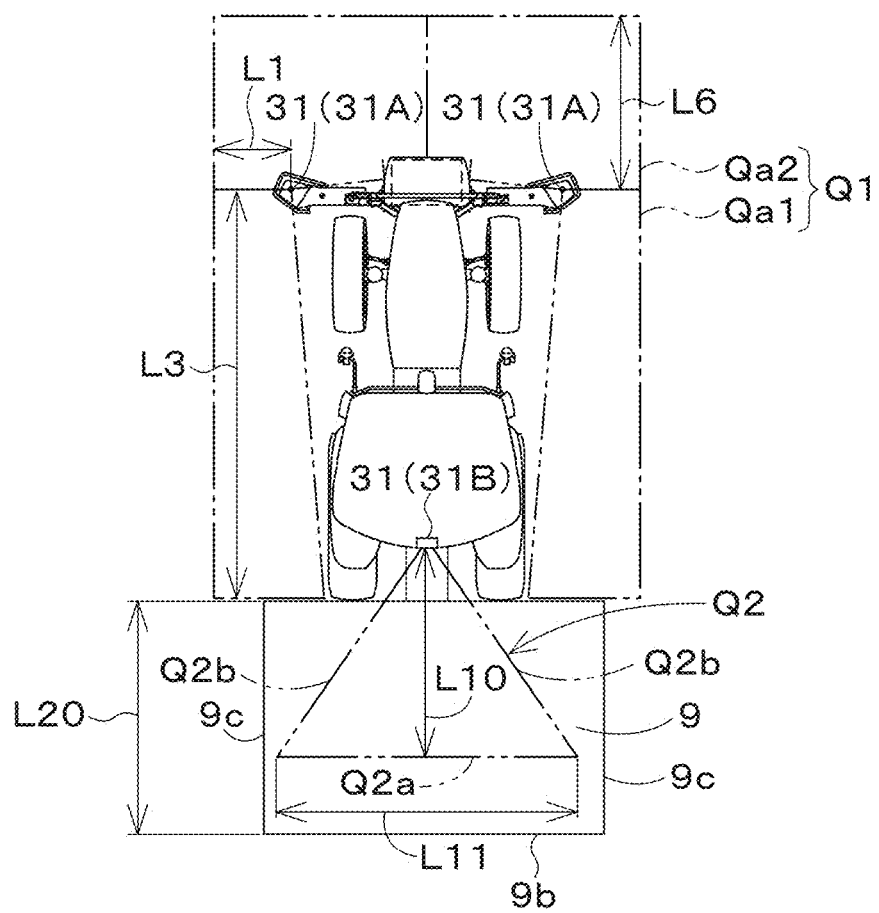
FIG. 8C illustrates a case in which a monitored area is shorter than the rear edge of the working device.
Figure 8D:
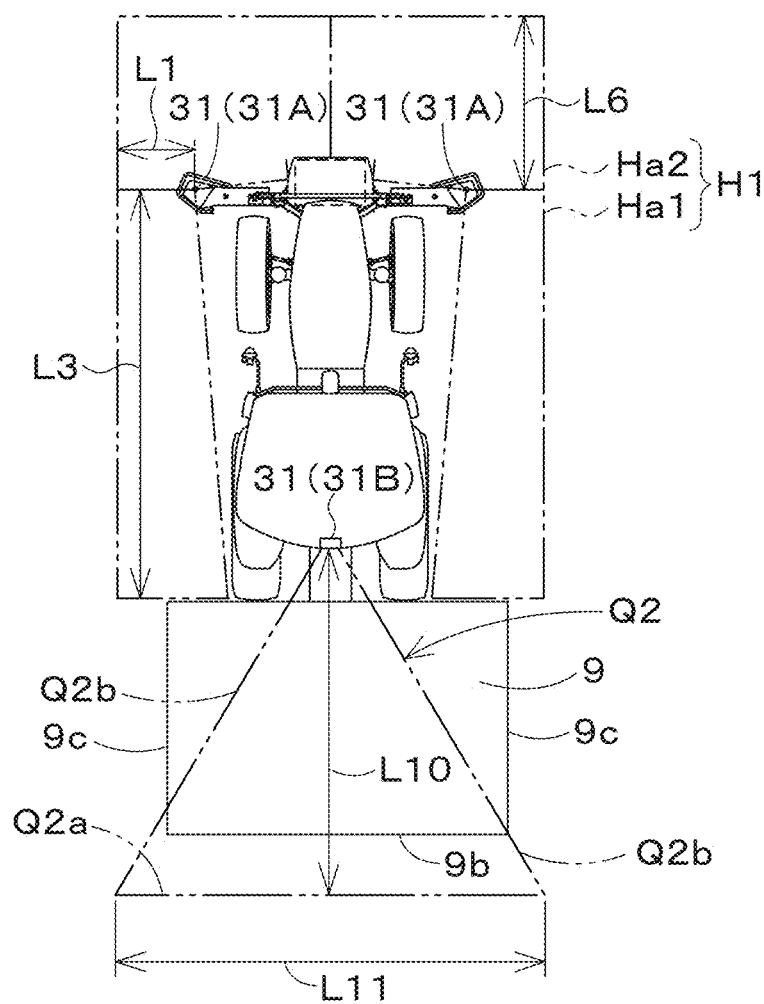
FIG. 8D illustrates a case in which the monitored area is longer than the rear edge of the working device.

As illustrated in FIG. 8C, when the monitored area Q2 is defined by the default values (reference monitor dimensions) of the monitor dimensions L10 and L11, if a rear edge Q2*a* of the monitored area Q2 is located forward of a rear edge 9*b* of the working device 9 and one or both of opposite boundaries Q2*b* of the monitored area Q2 in the width direction is/are located inward of corresponding one(s) of opposite ends 9*c* of the rear edge 9*b* of the working device 9 in the width direction, as illustrated in FIG. 8D, the setting change unit 27 makes the monitor dimensions L10 and L11 greater than the default values (reference monitor dimensions) so that the rear edge Q2*a* of the monitored area Q2 is located rearward of the rear edge 9*b* of the working device 9 and the opposite boundaries Q2*b* of the monitored area Q2 in the width direction are located outward of the respective opposite ends 9*c* of the rear edge 9*b* of the working device 9 in the width direction. In the present preferred embodiment, the front edge of the working device 9 can be detected by the front obstacle detecting devices 31A. Furthermore, by extending the monitor dimension(s) L3 of the front obstacle detecting device(s) 31A in a direction, it is possible to make a monitored area Hal and the working device 9 overlap each other.

Note that, although a method in which the setting change unit 27 acquires the machine width W10 of the working device 9 via the in-vehicle network N1 is discussed in the foregoing preferred embodiment, the setting change unit 27 may cause a display device 60 (see FIG. 3) of the tractor 1 to display an input screen for input of the machine width W10 and the machine length L20 of the working device 9 and acquire the machine width W10 of the working device 9 inputted into the input screen.

The setting change unit 27 changes criteria (the height threshold H4, the width threshold W4, and the first threshold T10) based on which the detected object M2 is determined as an obstacle. For example, in the case where work involves dust formation, etc., such as spreading work (fertilizer spreading work or agent spreading work) or cultivating work, the setting change unit 27 makes the height threshold H4 and the width threshold W4 smaller than the default values. In the case where the work is other than the spreading work (fertilizer spreading work or agent spreading work) and cultivating work, the setting change unit 27 sets the height threshold H4 and the width threshold W4 to the default values.

Figure 9:
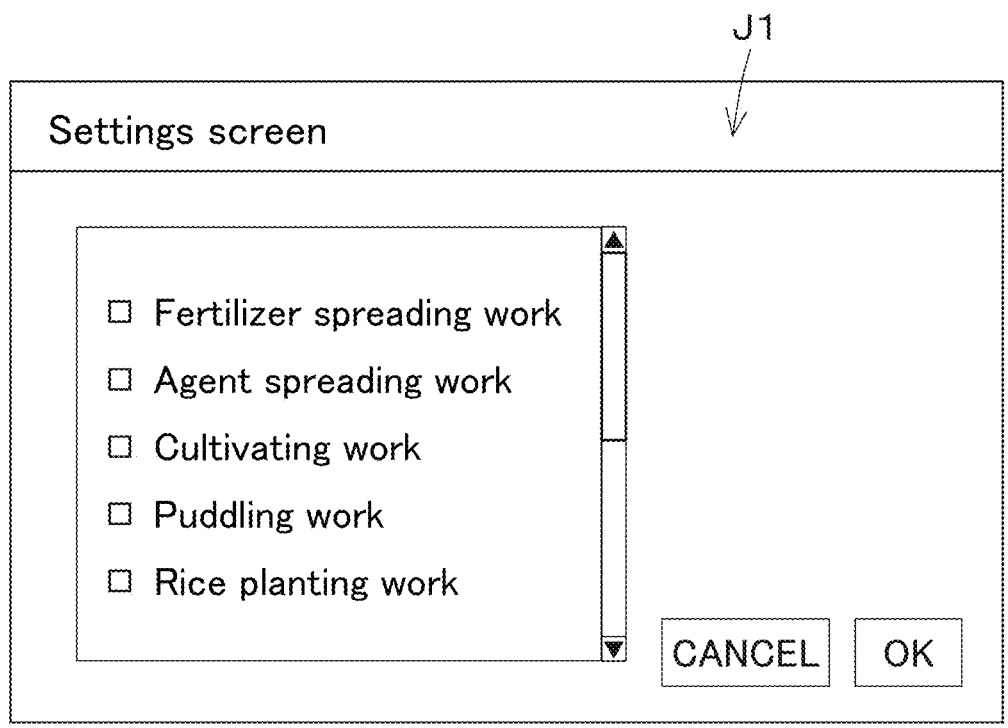
FIG. 9 illustrates an example of a settings screen.

As illustrated in FIG. 9, the setting change unit 27 causes a settings screen J1 in which work (agricultural work) is set to be displayed. The settings screen J1 displays a plurality of types of agricultural work. When fertilizer spreading work, agent spreading work, or cultivating work is selected in the settings screen J1, the height threshold H4 and the width threshold W4 are made smaller than the default values. When agricultural work other than fertilizer spreading work, agent spreading work, and cultivating work is selected, the height threshold H4 and the width threshold W4 are set to the default values. Alternatively, in the case where a working device 9 for fertilizer spreading work, agent spreading work, or cultivating work is linked to the vehicle body 2, the setting change unit 27 makes the height threshold H4 and the width threshold W4 smaller than the default values, and, in the case where a working device 9 for work other than fertilizer spreading work, agent spreading work, and cultivating work is linked to the vehicle body 2, the setting change unit 27 sets the height threshold H4 and the width threshold W4 to the default values.

Although the height threshold H4 and the width threshold W4 are changed according to either agricultural work or the working device 9 in the foregoing preferred embodiment, an elapsed time (first threshold T10) for determination of the detected object M2 as an obstacle may be changed. In such a case, when fertilizer spreading work, agent spreading work, or cultivating work is selected in the settings screen J1, the setting change unit 27 sets the first threshold T10 to the maximum value, and, when agricultural work other than fertilizer spreading work, agent spreading work, and cultivating work is selected, the setting change unit 27 sets the first threshold T10 to the default value. Alternatively, the setting change unit 27 sets the first threshold T10 to the maximum value and, when a working device 9 for work other than fertilizer spreading work, agent spreading work, and cultivating work is linked to the vehicle body 2, the setting change unit 27 sets the first threshold T10 to the default value.

The setting change unit 27 is configured to also change the front setting information for the front obstacle detecting devices 31A.

The setting change unit 27 changes the size of each monitored area Q1 according to the travel speed of the vehicle body 2. Specifically, when the vehicle speed (travel speed) of the vehicle body 2 detected by the vehicle speed sensor has exceeded a travel speed threshold, the setting change unit 27 changes the monitor dimension L6 so that the monitor dimension L6 is greater than the default value (reference monitor dimension). That is, the setting change unit 27 makes the monitor dimension L6 greater than the default value (reference monitor dimension) to make the size of the monitored area Q1 larger than the reference monitored area. On the contrary, if the travel speed has become less than the travel speed threshold, the setting change unit 27 changes the monitor dimension L6 so that the monitor dimension L6 is less than the default value (reference monitor dimension). That is, the setting change unit 27 makes the monitor dimension L6 less than the default value (reference monitor dimension) to make the size of the monitored area Q1 smaller than the reference monitored area.

Note that the monitor dimension L6 may be changed (increased or reduced) according to the travel speed. For example, the setting change unit 27 gradually increases the monitor dimension L6 as the travel speed increases and gradually reduces the monitor dimension L6 as the travel speed decreases, in proportion to the travel speed.

The setting change unit 27 changes the monitor dimension L5 according to the working device 9 linked to the vehicle body 2. Specifically, if the default value (reference monitor dimension) of the monitor dimension L5 is less than the machine width W10 of the working device 9, the setting change unit 27 makes the monitor dimension L5 greater than the machine width W10 of the working device 9.

The setting change unit 27 changes criteria (the height threshold H2, the width threshold W2, and the second threshold T11) based on which the detected object M1 is determined as an obstacle. Similar to the rear obstacle detecting device 31B, in the case where work is spreading work (fertilizer spreading work or agent spreading work), cultivating work, or the like, the setting change unit 27 makes the height threshold H2 and the width threshold W2 smaller than the default values. In the case where the work is other than spreading work (fertilizer spreading work or agent spreading work) and cultivating work, the setting change unit 27 sets the height threshold H2 and the width threshold W2 to the default values. Note that the default values of the height threshold H2 and the width threshold W2 corresponding to the detected object M1 are set to smaller values than the height threshold H4 and the width threshold W4 corresponding to the detected object M2.

Although the height threshold H2 and the width threshold W2 are changed according to either agricultural work or the working device 9 in the foregoing preferred embodiment, an elapsed time (first threshold T11) for determination of the detected object M1 as an obstacle may be changed.

When fertilizer spreading work, agent spreading work, or cultivating work is selected, the setting change unit 27 makes the first threshold T11 smaller than a default value, and, when agricultural work other than fertilizer spreading work, agent spreading work, and cultivating work is selected, the setting change unit 27 sets the first threshold T11 to the default value. Alternatively, when a working device 9 for fertilizer spreading work, agent spreading work, or cultivating work is linked to the vehicle body 2, the setting change unit 27 makes the second threshold T11 smaller than the default value, and when a working device 9 for work other than fertilizer spreading work, agent spreading work, and cultivating work is linked to the vehicle body 2, the setting change unit 27 sets the second threshold T11 to the default value. Alternatively, the setting change unit 27 may make the monitor dimension L6 smaller than the default value when fertilizer spreading work, agent spreading work, or cultivating work is selected.

Figure 10:
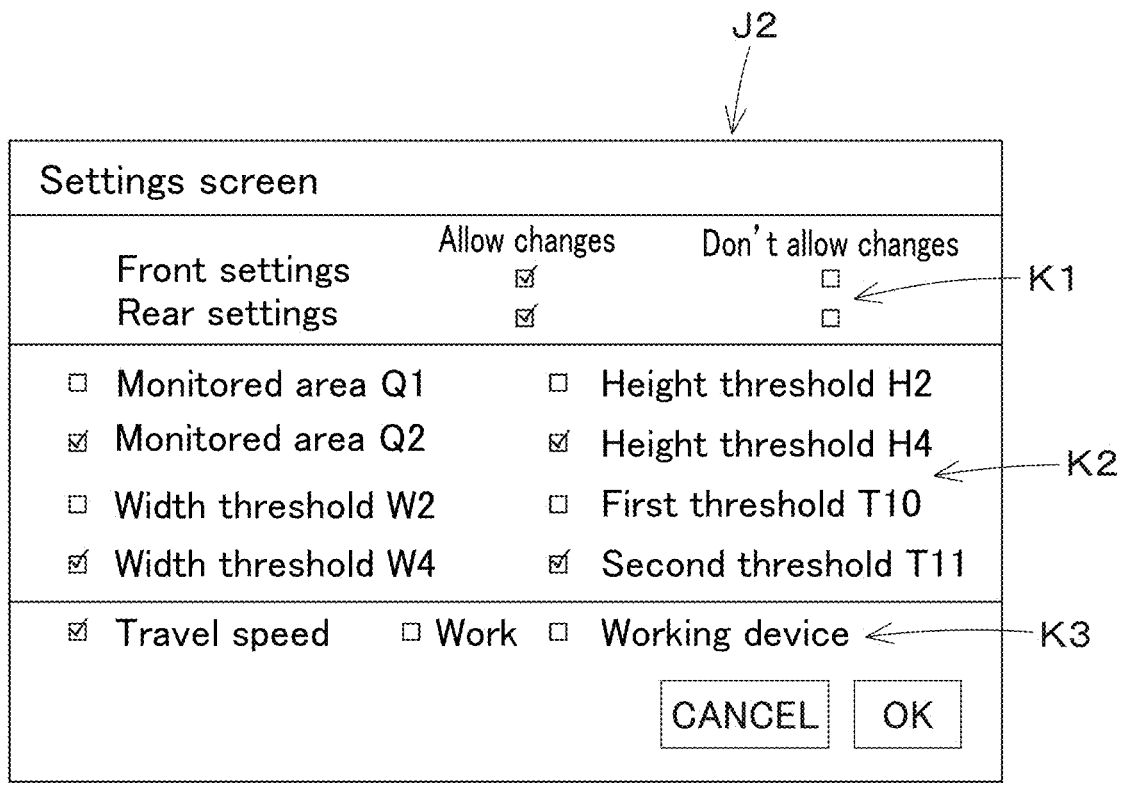
FIG. 10 illustrates an example of a settings screen.

As has been described, the front setting information and the rear setting information may each be changed by the setting change unit 27 in accordance and in conjunction with travel speed, work (agricultural work), and the type of working device 9 (which are herein collectively referred to as "change conditions") or may be changed independently in accordance with the travel speed, work (agricultural work), or the type of working device 9. As illustrated in FIG. 10, the display device 60 may display a settings screen J2, and settings regarding changes to the front setting information and the rear setting information may be performed by operating the display device 60 on the settings screen J2.

For example, the following may be included or performed: in a first section K1 of the settings screen J2, "allow changes (from default value(s) during automatic travel)" or "don't allow changes (from default value(s) during automatic travel)" can be selected for the front setting information and for the rear setting information. In the case of "allow changes" to the front setting information and to the rear setting information in the first section K1, as described earlier, setting information can be changed by the setting change unit 27 according to travel speed, work (agricultural work), the type of the working device 9, and/or the like. On the contrary, in the case of "don't allow changes" to the front setting information and to the rear setting information in a second column, changes are not made by the setting change unit 27, and default values are maintained during automatic travel.

The following may be included or performed: in a second section K2 of the settings screen J2, one or more items (the monitored areas Q1 and Q2, the height thresholds H2 and H4, the width thresholds W2 and W4, the first threshold T10, and/or the second threshold T11) to be changed when changes to the setting information are allowed can be selected. In such a case, piece(s) of the setting information (the front setting information and/or the rear setting information) corresponding to the item(s) selected in the second section K2 are changed.

The following may be included or performed: in a third section K3 of the settings screen J2, each of the change conditions [travel speed, work (agricultural work), and the type of working device 9] can be selected. In such a case, setting information (the front setting information and/or the rear setting information) is changed when the change condition(s) [travel speed, work (agricultural work), and/or the type of working device 9] corresponding to the item(s) selected in the third section K3 is/are satisfied during automatic travel.

As such, whether or not to allow changes to the front setting information and the rear setting information can be selected, and, when the changes are allowed, item(s) to be changed can be selected from a plurality of items, and change conditions can also be selected. This makes it possible to achieve settings corresponding to various situations in agricultural work. For example, changes can be made not only based on agricultural work itself but also based on the state of an agricultural filed on which agricultural work is to be done (e.g., soft soil, slope), the size of the tractor 1, the size of the working device 9, weather, and/or the like.

A working vehicle 1 includes a vehicle body 2, a linkage 8 provided on the vehicle body 2 to link a working device 9, a controller 25 to cause the vehicle body 2 to perform automatic travel, a rear obstacle detector 31B to detect obstacles behind the vehicle body 2, and a setting changer 27 to change rear setting information regarding obstacle detection performed by the rear obstacle detector 31B. With this, because the rear setting information for the rear obstacle detector 31B provided at the rear of the vehicle body 2 can be changed by the setting changer 27, it is possible to improve the accuracy of obstacle detection according to work done by the working device 9 and/or the travel (forward travel or rearward travel) of the vehicle body 2, and possible to do work appropriately according to various situations. In particular, by changing information for detection of obstacles in an area rearward of the vehicle body, it is possible to improve workability while achieving efficient automatic travel.

The rear setting information includes a size of a monitored area Q2 that is monitored to detect the obstacles, and the setting changer 27 changes the size of the monitored area Q2 according to a travel speed of the vehicle body 2. This makes it possible to change the monitored area Q2 according to travel speed corresponding to the work done by the working device 9. For example, in the case where work is done with the working device 9 at high speed, widening the monitored area Q2 makes it possible to quickly detect abnormalities during working while traveling rearward. On the contrary, in the case where work is done at low speed, narrowing the monitored area Q2 makes it possible to perform monitoring with higher accuracy. Furthermore, in the case where work is done at low speed, by narrowing the monitored area Q2, it is possible for the working device 9 to do work even in peripheral areas of the agricultural field and possible to increase work area.

The setting changer 27 changes a size of the monitored area Q2 according to the working device 9 linked to the vehicle body 2. With this, blind spots that may form at the rear depending on the size of the working device 9 are eliminated or minimized and, also in view of the condition of the ground after work that differs depending on the size of the working device 9, improved monitoring is achieved during work.

The rear setting information includes a size of an object M2 to be determined as an obstacle, and the setting changer 27 sets, according to work or the working device 9, the size of the object M2 to be determined as an obstacle. This makes it possible to reduce false detection of obstacles in the case of work that relatively involves dust formation such as fertilizer spreading work, agent spreading work, or cultivating work, and possible to improve the accuracy of obstacle detection in the case of work that does not involve dust formation.

The rear obstacle detector 31B includes a first time calculator 35 to calculate a detection time that is a period of time for which an object M2 located in the monitored area Q2 monitored to detect the obstacles is detected, and a first obstacle determiner 36 to determine the object M1, M2 as an obstacle if the detection time calculated by the first time calculator 35 is equal to or greater than a first threshold. This makes it possible to perform detection in consideration of the conditions in which the object M1 stays within the monitored area Q2.

The setting changer 27 changes the first threshold. With this, by changing a threshold relating to the period of time for which the object M2 stays within the monitored area Q2, it is possible to reduce false detection of obstacles in the case of work that relatively involves dust formation such as fertilizer spreading work, agent spreading work, or cultivating work, and possible to improve the accuracy of obstacle detection in the case of work that does not involve dust formation.

The working vehicle 1 further includes a front obstacle detector 31A to detect obstacles in front of the vehicle body 2, and the setting changer 27 changes front setting information regarding obstacle detection performed by the front obstacle detector 31A. With this, because it is possible to change the front setting information for the front obstacle detector 31A, it is possible to improve the accuracy of obstacle detection according to work done by the working device 9 and/or the travel (forward travel or rearward travel) of the vehicle body 2, and possible to do work appropriately according to various situations. In particular, the combination of the front setting information for the front of the vehicle body and the rear setting information makes it possible to perform obstacle detection with higher accuracy during mixed work such as work in which forward travel and rearward travel are repeated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a vehicle body;
   a linkage provided on the vehicle body to link a working device;
   a controller to cause the vehicle body to perform automatic travel;
   a rear obstacle detector to detect obstacles behind the vehicle body; and
   a setting changer to change rear setting information regarding obstacle detection performed by the rear obstacle detector; wherein
   the rear setting information includes a size of a monitored area that is monitored to detect the obstacles;
   the setting changer changes the size of the monitored area according to a travel speed of the vehicle body; and
   the rear obstacle detector includes:
      a first time calculator to calculate a detection time that is a period of time for which an object located in the monitored area monitored to detect the obstacles is detected; and
      a first obstacle determiner to determine the object as an obstacle if the detection time calculated by the first time calculator is equal to or greater than a first threshold.

2. The working vehicle according to claim 1, wherein the setting changer changes the size of the monitored area according to the working device linked to the vehicle body.

3. The working vehicle according to claim 2, wherein
   the rear setting information includes a size of an object to be determined as an obstacle; and
   the setting changer sets, according to work or the working device, the size of the object to be determined as the obstacle.

4. The working vehicle according to claim 1, wherein
   the rear setting information includes a size of an object to be determined as an obstacle; and
   the setting changer sets, according to work or the working device, the size of the object to be determined as the obstacle.

5. The working vehicle according to claim 1, wherein the setting changer changes the first threshold.

6. The working vehicle according to claim 5, further comprising a front obstacle detector to detect obstacles in front of the vehicle body; wherein the setting changer changes front setting information regarding obstacle detection performed by the front obstacle detector.

7. The working vehicle according to claim 1, further comprising a front obstacle detector to detect obstacles in front of the vehicle body; wherein
the setting changer changes front setting information regarding obstacle detection performed by the front obstacle detector.

8. A working vehicle comprising:
a vehicle body;
a linkage provided on the vehicle body to link a working device;
a controller to cause the vehicle body to perform automatic travel;
a rear obstacle detector to detect obstacles behind the vehicle body; and
a setting changer to change rear setting information regarding obstacle detection performed by the rear obstacle detector; wherein
the setting changer changes a size of a monitored area according to the working device linked to the vehicle body; and
the rear obstacle detector includes:
a first time calculator to calculate a detection time that is a period of time for which an object located in the monitored area monitored to detect the obstacles is detected; and
a first obstacle determiner to determine the object as an obstacle if the detection time calculated by the first time calculator is equal to or greater than a first threshold.

9. The working vehicle according to claim 8, wherein the setting changer changes the first threshold.

10. The working vehicle according to claim 8, further comprising a front obstacle detector to detect obstacles in front of the vehicle body; wherein
the setting changer changes front setting information regarding obstacle detection performed by the front obstacle detector.

11. The working vehicle according to claim 8, wherein
the rear setting information includes a size of an object to be determined as an obstacle; and
the setting changer sets, according to work or the working device, the size of the object to be determined as the obstacle.

12. A working vehicle comprising:
a vehicle body;
a linkage provided on the vehicle body to link a working device;
a controller to cause the vehicle body to perform automatic travel;
a rear obstacle detector to detect obstacles behind the vehicle body; and
a setting changer to change rear setting information regarding obstacle detection performed by the rear obstacle detector; wherein
the rear setting information includes a size of an object to be determined as an obstacle;
the setting changer sets, according to work or the working device, the size of the object to be determined as an obstacle; and
the rear obstacle detector includes:
a first time calculator to calculate a detection time that is a period of time for which an object located in the monitored area monitored to detect the obstacles is detected; and
a first obstacle determiner to determine the object as an obstacle if the detection time calculated by the first time calculator is equal to or greater than a first threshold.

13. The working vehicle according to claim 12, wherein the setting changer changes the first threshold.

14. The working vehicle according to claim 12, further comprising a front obstacle detector to detect obstacles in front of the vehicle body; wherein
the setting changer changes front setting information regarding obstacle detection performed by the front obstacle detector.

* * * * *